United States Patent
Boylan et al.

(10) Patent No.: US 6,445,597 B1
(45) Date of Patent: Sep. 3, 2002

(54) LOCAL LOOP CONTROL SYSTEM FOR A MULTIPLE OUTPUT POWER CONVERTER

(75) Inventors: Jeffrey J. Boylan, Richardson; Mark E. Jacobs, Dallas; Li Li, Richardson, all of TX (US)

(73) Assignee: Tyco Electronics Logistics AG, Steinbach (CH)

( * ) Notice: Subject to any disclaimer, the term of this patent is extended or adjusted under 35 U.S.C. 154(b) by 0 days.

(21) Appl. No.: 09/894,328

(22) Filed: Jun. 28, 2001

(51) Int. Cl.$^7$ ................................................ H02M 3/335
(52) U.S. Cl. .......................... 363/21.06; 363/70; 363/89
(58) Field of Search ............................ 363/21.06, 21.14, 363/70, 89, 127

(56) References Cited

U.S. PATENT DOCUMENTS

| | | | |
|---|---|---|---|
| 5,663,874 A | * 9/1997 | Mader et al. ................. 363/21 |
| 5,991,168 A | 11/1999 | Farrington et al. ........... 363/16 |
| 5,999,417 A | 12/1999 | Schlecht ....................... 363/16 |
| 6,297,970 B2 | * 10/2001 | Hemena et al. ............... 363/89 |
| 6,330,169 B2 | * 12/2001 | Mullett et al. ........... 363/21.06 |
| 6,342,737 B1 | * 1/2002 | Brodeur ................... 363/21.14 |

* cited by examiner

Primary Examiner—Jeffrey Sterrett

(57) ABSTRACT

A local loop control system and method of operating the same for use with a power converter. The power converter includes a first output coupled to a first synchronous rectifier circuit and a second output coupled to a second synchronous rectifier circuit. The power converter employs a main controller configured to regulate a voltage proportional to a weighted sum of the first and go second outputs. In one embodiment, the local loop control system includes: (1) a first output controller configured to regulate a voltage at the first output and (2) a second output controller configured to regulate a voltage at the second output, one of the first and second output controllers configured to reduce a drive signal to a corresponding one of the first and second synchronous rectifier circuits when a corresponding voltage at one of the first and second outputs exceeds a voltage proportional to the weighted sum.

21 Claims, 3 Drawing Sheets

LOCAL LOOP CONTROL SYSTEM FOR A MULTIPLE OUTPUT POWER CONVERTER

TECHNICAL FIELD OF THE INVENTION

The present invention is directed, in general, to power electronics and, more specifically, to a local loop control system and a multiple output power converter employing the same.

BACKGROUND OF THE INVENTION

Multiple output switching converters are often employed to provide multiple output voltage levels from a single transformer with the outputs consisting of a main output and at least one auxiliary output. Typically, the main output is designed to operate at a higher voltage (e.g., a higher DC voltage) than the auxiliary output. When changes in load conditions occur, multiple output converters endure output voltage variations that are detrimental to the overall operation of the converter. In switching converters, a controlling parameter, such as the duty cycle of the main power switch therein, may be regulated to either increase or decrease the voltages at the main and auxiliary outputs, concurrently. When only one output is regulated, however, all other outputs may be adversely affected with load variations. The problem is exacerbated when the load requirements at the outputs move in opposite directions, since each output demands a conflicting change in duty cycle of the main power switch to adjust the output voltage to the desired value.

Common techniques for improving output regulation of a multiple output converter include weighted sum averaging, series pass regulation and shunt regulation. Weighted sum averaging allows improvement of the output regulation of one output at the expense of the other. A series pass regulator may be used to regulate small amounts of current. As current requirements increase, the series pass regulator becomes more expensive and the power losses increase. Shunt regulators divert current through parallel impedances in order to vary the output voltage. The current is shunted to the ground or common side and power is dissipated. Each of these techniques offers trade-offs between the efficiency and regulation of the converter.

Another technique used in multiple output converters is called a current diverter circuit (see, for instance, U.S. Pat. No. 5,991,168 entitled "Transient Response Network, Method of Diverting Energy in a Multiple Output Power Converter Employing the Same," by Farrington, et al., issued Nov. 23, 1999, which is incorporated by reference). The current diverter circuit is basically a shunt regulator for application to multiple output converters that do not have independent regulation of the separate outputs. The current diverter circuit intermittently or continuously bleeds current from the higher voltage output to the lower voltage output. This technique, although an improvement from an efficiency perspective over straight shunt or series regulators, results in a continuous or continuing power loss with a resulting degradation of the power unit efficiency. Additionally, there is a practical limit to the maximum power that can be bled from one output to the other.

Multiple output converters which employ independent precision regulators for each output are able to achieve accurate regulation of both outputs. Typically, the main output voltage is controlled by regulating the energy applied to the transformer using pulse width modulation control of the main power switch on the primary side of the transformer. The other or auxiliary output, on the other hand, is regulated independently on the secondary side of the transformer. The independent regulation may be a magnetic amplifier or an equivalent active circuit.

A particularly troubling problem exists in multiple output converters employing independent precision regulators when a significant portion of the load on the main output decreases. When the load is removed or greatly reduced, the regulating circuit for the main output drops to a minimum duty-cycle condition. Since the auxiliary output also receives its input from energy transferred across the transformer, the independent regulating means for the auxiliary output typically cannot compensate for the substantial decline of the regulating signal for the main output. Consequently, the auxiliary output drops out of regulation for a period of time causing an unacceptable decrease in the auxiliary output voltage. If the auxiliary output is supplying power to a computer circuit, for instance, the loss of regulation, even for a brief period of time, can have catastrophic consequences. These consequences often cannot be corrected even when the load at the main output returns to an acceptable level and regulation of the auxiliary output is restored.

As synchronous rectifiers are introduced into the design of multiple output converters to improve efficiency, there is an opportunity to use them in a dual role of improving efficiency and adjusting their forward drop to provide improved voltage regulation. Although this approach has been previously proposed [see U.S. Pat. No. 5,999,417, entitled "HIGH EFFICIENCY POWER CONVERTER", to Martin F. Schlecht, issued Dec. 7, 1999, which is incorporated herein by reference], it typically generates a conflict between the primary voltage control loop and the local regulation loops as each attempts to adjust the output voltages. This condition introduces an opportunity for instability, which may create correspondingly difficult design compromises. A control process that would allow the principal power control and the separate output controls to effectively maintain the required outputs while minimizing conflict and without sacrificing overall efficiency is highly desirable.

Accordingly, what is needed in the art is a way to preserve the overall efficiency of a multiple output converter while effectively maintaining regulation of the output voltages.

SUMMARY OF THE INVENTION

To address the above-discussed deficiencies of the prior art, the present invention provides a local loop control system and method of operating the same for use with a power converter. The power converter includes a first output coupled to a first synchronous rectifier circuit, a second output coupled to a second synchronous rectifier circuit and a main controller configured to regulate a voltage proportional to a weighted sum of the first and second outputs. In one embodiment, the local loop control system includes a first output controller configured to regulate a voltage at the first output and a second output controller configured to regulate a voltage at the second output. One of the first and second output controllers is configured to reduce a drive signal to a corresponding one of the first and second synchronous rectifier circuits when a corresponding voltage at one of the first and second outputs exceeds a voltage proportional to the weighted sum.

In another aspect, the present invention provides a method of operating a local loop control system for use with a power converter. The power converter includes a first output coupled to a first synchronous rectifier circuit, a second output coupled to a second synchronous rectifier circuit and a main controller configured to regulate a voltage proportional to a weighted sum of the first and second outputs. The method of operating the local loop control system includes regulating a voltage at the first output with a first output controller and regulating a voltage at the second output with a second output controller. One of the first and second output controllers reduces a drive signal to a corresponding one of the first and second synchronous rectifier circuits when a corresponding voltage at one of the first and second outputs exceeds a voltage proportional to the weighted sum.

The present invention also provides, in another aspect, a power converter that includes a transformer having a primary If winding and first and second secondary windings. The power converter also includes a primary power stage, coupled to the primary winding, associated with a main controller that controls a primary power switch to regulate a voltage proportional to a weighted sum of first and second outputs of the power converter. The power converter further includes a first secondary stage, coupled to the first secondary winding, having a first synchronous rectifier circuit coupled to a first output controller that regulates a voltage at the first output. The power converter still further includes a second secondary stage, coupled to the second secondary winding, having a second synchronous rectifier circuit coupled to a second output controller that regulates a voltage at the second output. One of the first and second output controllers reduces a drive signal to a corresponding one of the first and second synchronous rectifier circuits when a corresponding voltage at one of the first and second outputs exceeds a voltage proportional to the weighted sum.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
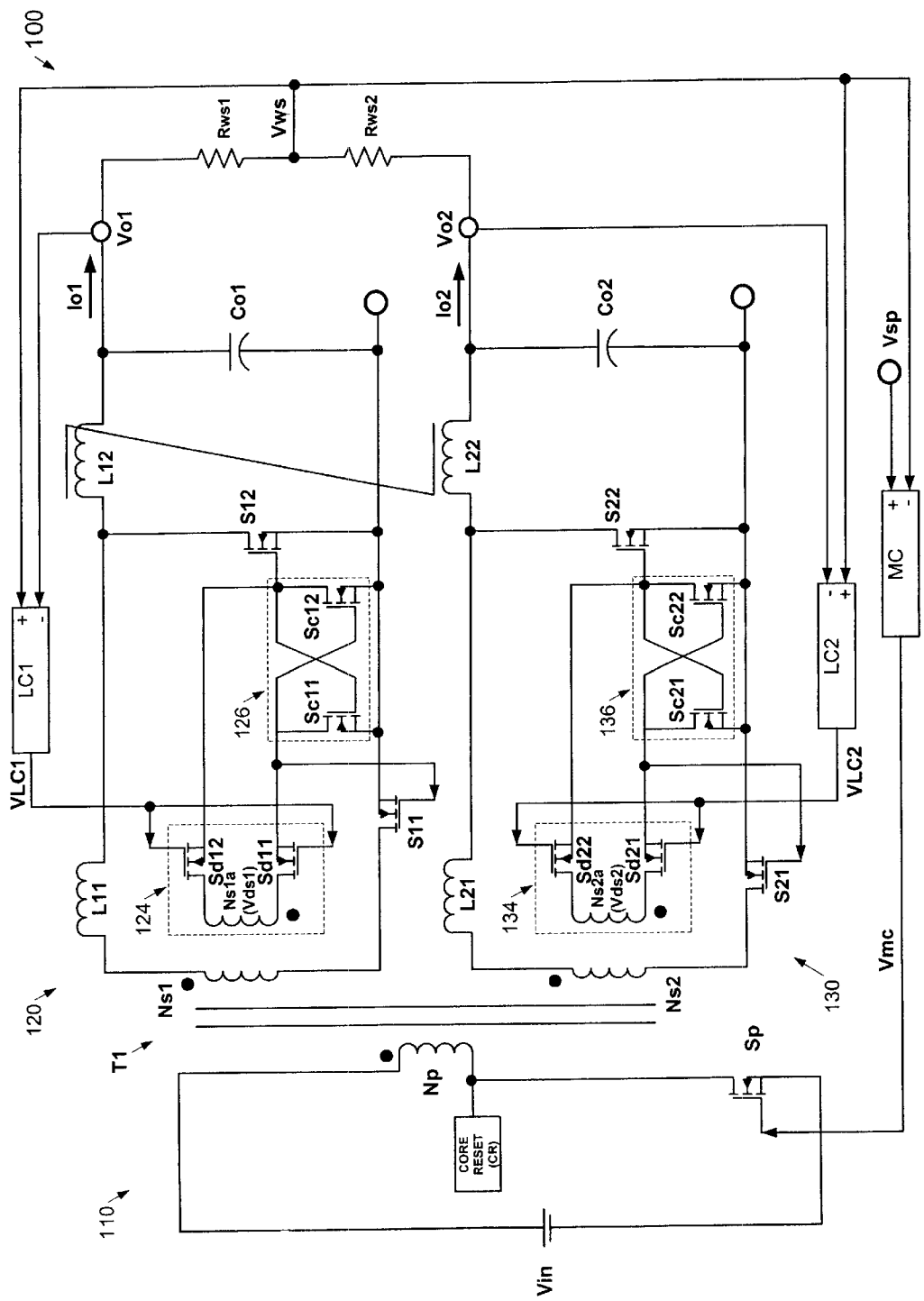
FIG. 1 illustrates a schematic diagram of an embodiment of a power converter constructed according to the principles of the present invention.

Referring initially to FIG. 1, illustrated is a schematic diagram of an embodiment of a power converter 100 constructed according to the principles of the present invention. The power converter 100 includes a transformer T1 having a primary winding Np and first and second secondary windings Ns1, Ns2. The power converter 100 also includes a primary power stage 110 coupled to the primary winding Np and first and second secondary stages 120, 130, respectively, coupled to the first and second secondary windings Ns1, Ns2. The first secondary stage 120 provides a first output having a first output voltage Vo1 and a first output current Io1. Similarity, the second secondary stage 130 provides a second output having a second output voltage Vo2 and a second output current Io2. Of course, the first and second output voltages Vo1, Vo2 may generally have different values, and their corresponding first and second output currents Io1, Io2 may also differ.

The primary power stage 110, which is coupled to a DC input voltage Vin, includes a core reset circuit CR coupled to the primary winding Np and a primary power switch Sp, which is controlled by a main controller MC. The primary power switch Sp and the core reset circuit CR cooperate to generate an AC signal across the primary winding Np. The main controller MC provides a primary drive signal Vmc to control the primary power switch Sp with a duty cycle in response to a voltage proportional to a weighted sum of the first and second outputs of the power converter 100.

In the illustrated embodiment, a weighted sum voltage Vws is provided by a resistor divider network having first and second divider resistors Rws1, Rws2, not necessarily equal, which are connected between the first and second outputs, as shown. The values of the first and second divider resistors Rws1, Rws2 determine the contribution of each of the first and second outputs to the weighted sum voltage Vws. Correspondingly, a value of the weighted sum voltage Vws is maintained by a control loop involving the main controller MC and the primary power stage 110. The controlled value of the weighted sum voltage Vws is affected by a value of a setpoint voltage Vsp, which is provided to the main controller MC.

The first secondary stage 120 includes a first synchronous rectifier circuit having first and second synchronous rectifier switches S11, S12, a first output controller LC1 that regulates the first output voltage Vo1, a first output inductor L12 and a first output capacitor Co1. An inductor L11 shown in FIG. 1 represents a leakage inductance of the transformer T1 and may not appear as an actual physical element in the circuit. The first output controller LC1 provides a first local drive signal VLC1 to a first driver circuit 124 and a first turn-off circuit 126 that are used to control the operation of the first and second synchronous rectifier switches S11, S12. The first driver circuit 124 includes a first auxiliary transformer winding Ns1a, coupled to the transformer T1 and first and second drive voltage limiting switches Sd11, Sd12. The first turn-off circuit 126 includes first and second turn-off switches Sc11, Sc12.

Similarly, the second secondary stage 130 includes a second synchronous rectifier circuit having third and fourth synchronous rectifier switches S21, S22, a second output controller LC2 that regulates the second output voltage Vo2, a second output inductor L22 and a second output capacitor Co2. An inductor L21 shown in FIG. 1 also represents a leakage inductance of the transformer T1 and may not appear as an actual physical element in the circuit. The second output controller LC2 provides a second local drive signal VLC2 to a second driver circuit 134 and a second turn-off circuit 136 that are used to control the operation of the third and fourth synchronous rectifier switches S21, S22. The second driver circuit 134 includes a second auxiliary transformer winding Ns2a, coupled to the transformer T1 and third and fourth drive voltage limiting switches Sd21, Sd22. The second turn-off circuit 136 includes third and fourth turn-off switches Sc21, Sc22.

In this example, the first secondary stage 120 performs as a forward converter, wherein the first secondary winding Ns1 and the first and second synchronous rectifier switches S11, S12 cooperate to provide an intermediate DC voltage. This intermediate DC voltage is further filtered by the first output inductor L12 and the first output capacitor Co1 to provide the first output voltage Vo1. Regulation of this first output voltage Vo1 for varying values of the first output current Io1 is provided by the first output controller LC1 through an appropriate interaction with the first and second synchronous rectifier switches S11, S12.

The first output controller LC1 accepts inputs from the weighted sum voltage Vws and the first output voltage Vo1 to provide the first local drive signal VLC1 to the first driver circuit 124. The first local drive signal VLC1 provides a control signal for the first and second drive voltage limiting switches Sd11, Sd12 of the first drive circuit 124 so that the maximum ON gate voltage for the synchronous rectifier switches S11, S12 is thereby limited. This, in turn, modifies a first drive-signal voltage Vds1, provided by the first auxiliary transformer winding Ns1$a$, that is applied to the first and second synchronous rectifier switches S11, S12.

The modified first drive signal voltage Vds1 appropriately increases or decreases the conduction of the first and second synchronous rectifier switches S11, S12 to provide the required first output voltage Vo1 for a given first output current Io1. The first and second turn-off switches Sc11, Sc12, respectively, assure rapid turn-off of the respective synchronous rectifier switch S11, S12 by forming a clamp across the one to be turned off. Regulation of the second output voltage Vo2 of the second secondary stage 130 is accomplished in a manner similar to the regulation of the first output voltage Vo1 of the first secondary stage 120. An additional measure to improve cross regulation between the first and second secondary stages 120, 130 is afforded by the first and second output inductors L12, L22, which share a common core and are magnetically coupled.

In the illustrated embodiment, a local loop control system includes the first and second output controllers LC1, LC2 and may also include the resistor divider network and the first and second driver circuits 124, 134. The local loop control system operates such that one of the first and second output controllers LC1, LC2 reduces a drive signal to a corresponding one of the first and second synchronous rectifier circuits when a corresponding voltage at one of the first and second outputs exceeds a voltage proportional to the weighted sum. This action will be further discussed with respect to FIGS. 2 and 3.

Figure 2:
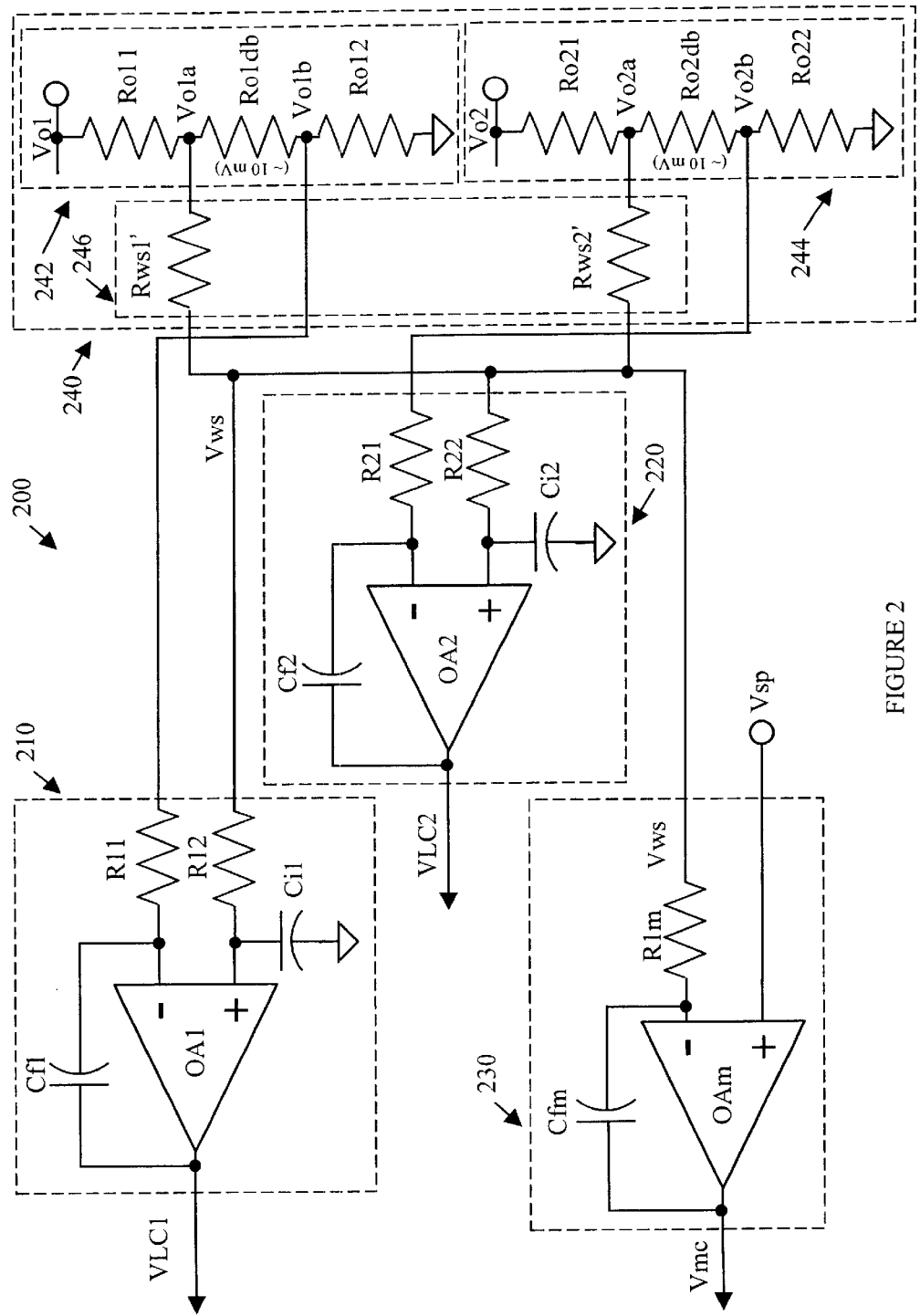
FIG. 2 illustrates a schematic diagram of an embodiment of first and second local controllers, a main controller and a resistor divider network constructed according to the principles of the present invention.

Turning now to FIG. 2, illustrated is a schematic diagram 200 of an embodiment of first and second output controllers 210, 220, a main controller 230 and a resistor divider network 240 constructed according to the principles of the present invention. The first and second output controllers 210, 220 and the resistor divider network 240 may form portions of a local loop control system as was discussed with respect to FIG. 1. The first output controller 210 includes a first operational amplifier OA1, first and second input resistors R11, R12, a first input capacitor Ci1 and a first feedback capacitor Cf1. The second output controller 220 includes a second operational amplifier OA2, third and fourth input resistors R21, R22, a second input capacitor Ci2 and a second feedback capacitor Cf2. The main controller 230 includes a third operational amplifier OAm, a fifth input resistor R1m and a third feedback capacitor Cfm.

The resistor divider network 240 includes a first output resistor divider 242, a second output resistor divider 244 and a weighted sum resistor divider 246. The first output resistor divider 242 includes first, second and third resistors Ro11, Ro1db, Ro12, and the second output resistor divider 244 includes fourth, fifth and sixth resistors Ro21, Ro2db, Ro22. The weighted sum resistor divider 246 includes seventh and eighth resistors Rws1', Rws2'.

The first output resistor divider 242 provides a first divided voltage Vo1$a$ for use by the weighted sum resistor divider 246 and a second divided voltage Vo1$b$ that is, in an exemplary embodiment, about 10 millivolts more negative than the first divided voltage Vo1$a$. Similarly, the second output resistor divider 244 provides a third divided voltage Vo2$a$ for use by the weighted sum resistor divider 246 and a fourth divided voltage Vo2$b$ that is, in an exemplary embodiment, about 10 millivolts more negative than the third divided voltage Vo2$a$. It is not necessary that both control loops include the small voltage offset of 10 millivolts, in this example. The inclusion of a small voltage offset in only one of the control loops may be sufficient. The seventh and eighth resistors Rws1', Rws2' are series-coupled and respectively connected to the first and third divided voltages Vo1$a$, Vo2$a$ to provide a weighted sum voltage Vws at their common point. The weighted sum voltage Vws is thereby proportional to the first and second output voltages Vo1, Vo2.

The weighted sum voltage Vws is provided to the inverting input of the third operational amplifier OAm through the fifth input resistor R1m. The third operational amplifier OAm controls a primary stage, as discussed with respect to FIG. 1, by providing a primary drive signal Vmc that is proportional to a weighted sum of the first and second output voltages Vo1, Vo2. The third feedback capacitor Cfm provides appropriate filtering and spectral shaping for stability of the control loop of the primary drive signal Vmc. A setpoint voltage Vsp, which is applied to the non-inverting input of the third operational amplifier OAm, provides a scaling capability for the weighted sum. This allows the first and second output voltages Vo1, Vo2 to be proportionally increased or decreased in response to an increase or decrease in the value of the setpoint voltage Vsp.

In similar fashion, the weighted sum voltage Vws is also provided to the non-inverting inputs of the first and second operational amplifiers OA1, OA2 through the second and fourth input resistors R12, R22, respectively. The first and second input capacitors Ci1, Ci2 provide appropriate filtering and spectral shaping for stability of their respective control loops. Through this arrangement, the weighted sum voltage Vws functions as a setpoint for the first and second operational amplifiers OA1, OA2.

The second and fourth divided voltages Vo1$b$, Vo2$b$ are provided to the inverting inputs of the first and second operational amplifiers OA1, OA2 through the first and third input resistors R11, R21, respectively. The first and second feedback capacitors Cf1, Cf2 provide filtering and spectral shaping for stability of their respective control loops, as before. These voltages are slightly more negative than the first and third divided voltages Vo1$a$, Vo2$a$ that are provided to the weighted sum resistor divider 246. This condition establishes an operational deadband, which improves control stability, and provides first and second local drive signals VLC1, VLC2 that are sufficient to saturate their respective drivers.

When one of the output currents decreases its value due to a change in output load requirements, the corresponding output voltage associated with this output current tends to increase momentarily. If this were to occur for the first output voltage Vo1, for example, this action would cause the second output voltage Vo2 to decrease momentarily, since the main controller 230 maintains the weighted sum voltage Vws at a constant value. The inverting input of the first operational amplifier OA1, which is associated with the increase in the first output voltage Vo1, then becomes more positive than its non-inverting input. This condition forces the first local drive signal VLC1 to decrease in value thereby causing the first output voltage Vo1 to also decrease to its desired value. This action also allows the second output voltage Vo2 to return to its desired value, as well, without substantially altering the value of the second local drive signal VLC2. This situation is further discussed with respect to FIG.

The control process, generally described with respect to FIG. 2, may be more easily understood by using a specific example. This example demonstrates the importance of a weighted sum input to the output controllers rather than a fixed or adjustable reference voltage. Assume that the first and second output voltages Vo1, Vo2 are one volt and two volts, respectively. Construct a weighted sum voltage Vws to be 50 percent of the first output voltage Vo1 and 25 percent of the second output voltage Vo2. This provides a weighted sum voltage Vws of one volt. The first output controller 210 for the first output voltage Vo1 uses this one volt value of the weighted sum voltage Vws as its non-inverting input. Correspondingly, its inverting input receives a voltage that is about 10 millivolts less than one volt. Similarly, the second output controller 220 for the second output voltage Vo2 also uses this one volt value of the weighted sum voltage Vws as its non-inverting input and uses 50 percent of the second output voltage Vo2 minus about 10 millivolts as its inverting input.

If the first output voltage Vo1 is below the weighted sum voltage Vws of one volt, then 50 percent of the second output voltage Vo2 will be above the one volt weighted sum voltage Vws. Of course, the inverse of this relationship is also true since a fixed average value of two quantities dictates that if one is above the other must be below the average value, unless they are equal. Accordingly, a relatively high second output voltage Vo2 may be reduced by a reduction of its drive signal to the associated synchronous rectifier switches. Alternatively, the associated synchronous rectifier switches for the first output Vo1, which is low relative to the weighted sum voltage Vws, will be controlled to be fully ON.

Thus, preferably one set of synchronous rectifier switches will be subjected to a reduced drive as a consequence of using a weighted sum voltage to the inputs of the output controllers. The voltage reductions of about 10 millivolts provide a deadband by establishing a small operating region in which all synchronous rectifier switches are fully ON when both the first and second output voltages Vo1, Vo2 are near their desired values with respect to the weighted sum voltage Vws.

Figure 3:
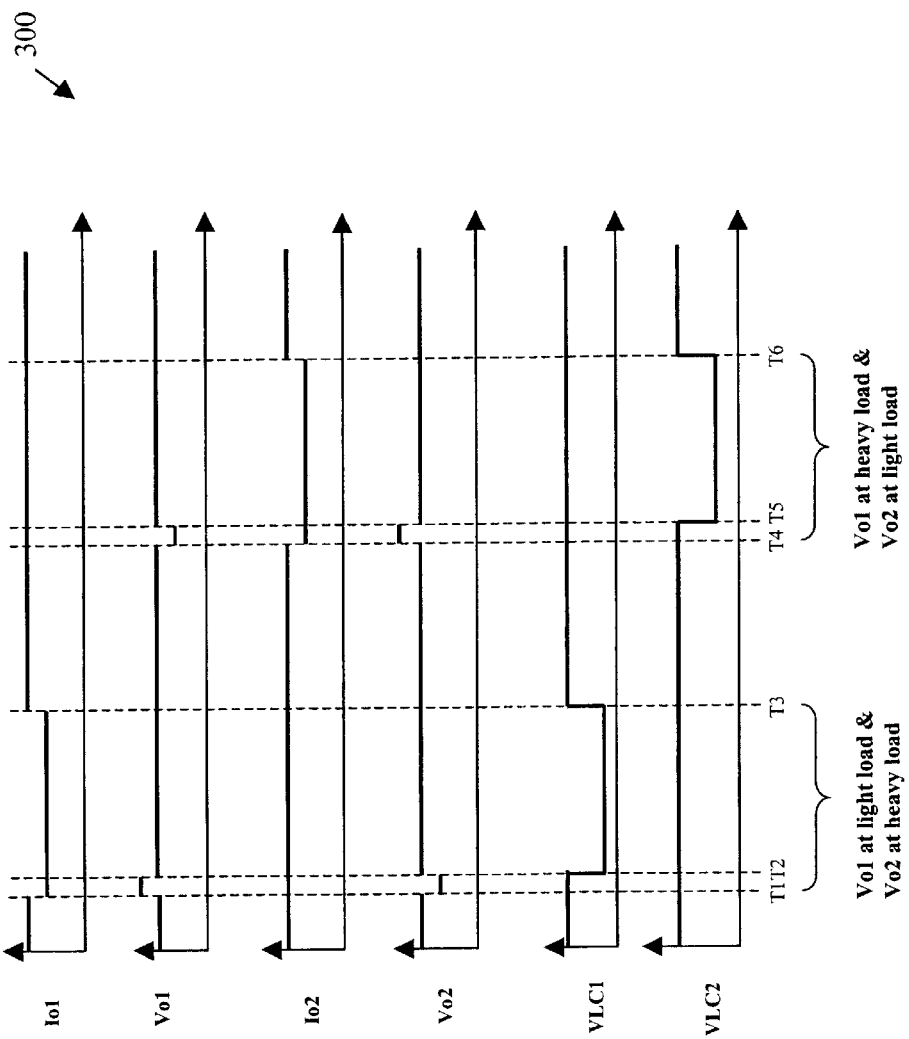
FIG. 3 illustrates a timing diagram of an embodiment of an operation of a local loop control system constructed according to the principles of the present invention.

Turning now to FIG. 3, illustrated is a timing diagram 300 of an embodiment of an operation of a local loop control system constructed according to the principles of the present invention. The timing diagram 300 includes waveforms of a first output current Io1, a first output voltage Vo1, a second output current Io2, a second output voltage Vo2, a first local drive signal VLC1 and a second local drive signal VLC2.

Before a time T1, the first and second output voltages Vo1, Vo2 are seen to be in a constant or steady-state condition for the first and second output currents Io1, Io2. At the time T1, a decrease in the first output current Io1 occurs while the second output current Io2 remains constant. This event causes the first output voltage Vo1 to increase momentarily. As discussed with respect to FIG. 1, the function of a main controller MC is to maintain a weighted sum of the first and second output voltages Vo1, Vo2. This action causes the second output voltage Vo2 to decrease momentarily to offset the increase in the first output voltage Vo1 so that the value of the weighted sum is maintained.

At a time T2, the first local drive signal VLC1 is appropriately reduced by the action of a first output controller LC1 such as the one discussed with respect to FIG. 1 while the second local drive signal VLC2 maintains its drive signal level substantially unmodified. This condition restores the first output voltage Vo1 to its steady-state value prior to the time T1 and thereby causes the second output voltage Vo2 to also be restored to its steady-state value through the weighted sum action of the main controller MC. This condition continues until a time T3 wherein the first output current Io1 again increases to its value prior to the time Ti. This event causes the first local drive signal VLC1 to increase to its previous value prior to the time T1 thereby maintaining the first output voltage Vo1 at its appropriate steady-state value.

Then, at a time T4, the second output current Io2 decreases while the first output current Io1 remains constant. This event causes the second output voltage Vo2 to increase and the first output voltage Vo1 to decrease momentarily so that, as before, the value of the weighted sum is again maintained. At a time T5, the second local drive signal VLC2 is appropriately reduced by the action of a second output controller LC2, such as the one discussed with respect to FIG. 1, while the first local drive signal VLC1 maintains its drive signal level substantially unmodified.

This condition restores both the second output voltage Vo2 and the first output voltage Vo1 to their steady-state values prior to the time T4. This condition continues until a time T6 wherein the second output current Io2 again increases to its value prior to the time T4. This event causes the second local drive signal VLC2 to increase to its previous value prior to the time T4 thereby maintaining the second output voltage Vo2 at its appropriate steady-state value.

In summary, it has been demonstrated that the use of a local loop control system, constructed in accordance with principles of the present invention, may be advantageously employed in a power converter having multiple outputs. In the present invention, the local loop control system preferably reduces the appropriate local drive signal to a synchronous rectifier circuit associated with an output that tends to exceed a voltage proportional to a weighted sum of the output voltages. Such action appropriately restores all output voltages to their expected values while preserving overall efficiency of the power converter.

The combination of a weighted sum main control loop and a local loop control system thereby provides an advantage in control circuit design. Using weighted control, a weighted sum of two output voltages may be regulated under the two conditions where either each output is operating at its correct output voltage value or one of the output values is too high and the other is too low. For the second condition, the high output voltage may be reduced by employing negative feedback in its local control loop. This negative feedback may be appropriately implemented using operational amplifiers.

This action momentarily increases the forward voltage drop of the synchronous rectifier switches associated with the high output voltage thereby lowering the output voltage. For this condition, the local control loop associated with the low output voltage will remain substantially unchanged or inactive. However, the low output voltage will increase to its correct value in accordance with weighted sum control. At this time, the synchronous rectifier switches associated with the output voltage that was too high may return to their low forward voltage drop condition, thereby maintaining overall efficiency.

If weighted sum feedback were not used, for example, only a first output voltage may be regulated by a main control loop. A second output voltage would then be regulated by a local control loop. Load variations, causing the second output voltage to be too high or too low, creates overall efficiency problems. This occurs since the associated synchronous rectifier switches continuously modify their forward voltage drop to regulate the output voltage compared to momentarily modifying their forward voltage when weighted sum feedback is employed.

Those skilled in the art should understand that the previously described embodiments of the power converter and system for improving response of a control loop of the power converter are submitted for illustrative purposes only and other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. For a better understanding of a variety of power converter topologies employing discrete and integrated magnetic techniques, see, *Modern DC-to-DC Switchmode Power Converter Circuits*, by Rudolph P. Severns and Gordon Bloom, Van Nostrand Reinhold Company, New York, N.Y. (1985), which is incorporated herein by reference in its entirety. In addition, for a better understanding of discrete-time representation and control of analog systems, see *Digital Signal Processing*, 3rd Edition, by J. G. Proakis and D. G. Manolakis, Prentice Hall (1996), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. For use with a power converter having a first output coupled to a first synchronous rectifier circuit and a second output coupled to a second synchronous rectifier circuit and a main controller configured to regulate a voltage proportional to a weighted sum of said first and second outputs, a local loop control system, comprising:
   a first output controller configured to regulate a voltage at said first output; and
   a second output controller configured to regulate a voltage at said second output, one of said first and second output controllers configured to reduce a drive signal to a corresponding one of said first and second synchronous rectifier circuits when a corresponding voltage at one of said first and second outputs exceeds a voltage proportional to said weighted sum.

2. The local loop control system as recited in claim 1 further comprising a resistor divider network.

3. The local loop control system as recited in claim 2 wherein a resistor of said resistor divider network is configured to provide a deadband for said first and second output controllers.

4. The local loop control system as recited in claim 1 wherein each of said first and second output controllers comprises operational amplifiers.

5. The local loop control system as recited in claim 1 wherein the other of said first and second output controllers is configured to maintain a drive signal to the corresponding other said first or second synchronous rectifier circuit substantially unmodified.

6. The local loop control system as recited in claim 1 wherein each of said first and second synchronous rectifier circuits comprise at least one synchronous rectifier switch.

7. The local loop control system as recited in claim 1 wherein each of said first and second synchronous rectifier circuits comprise at least one d rive voltage limiting switch.

8. A method of operating a local loop control system for use with a power converter having a first output coupled to a first synchronous rectifier circuit and a second output coupled to a second synchronous rectifier circuit and a main controller configured to regulate a voltage proportional to a weighted sum of said first and second outputs, comprising:
   regulating a voltage at said first output with a first output controller; and
   regulating a voltage at said second output with a second output controller, one of said first and second output controllers reducing a drive signal to a corresponding one of said first and second synchronous rectifier circuits when a corresponding voltage at one of said first and second outputs exceeds a voltage proportional to said weighted sum.

9. The method as recited in claim 8 wherein said weighted sum is established by a resistor divider network.

10. The method as recited in claim 8 further comprising providing a deadband for said first and second output controllers.

11. The method as recited in claim 8 wherein each of said first and second output controllers comprises operational amplifiers.

12. The method as recited in claim 8 wherein an other of said first and second output controllers maintains a drive signal to a corresponding other one of said first and second synchronous rectifier circuits substantially unmodified.

13. The method as recited in claim 8 wherein each of said first and second synchronous rectifier circuits comprise at least one synchronous rectifier switch.

14. The method as recited in claim 8 wherein each of said first and second synchronous rectifier circuits comprise at least one drive voltage limiting switch.

15. A power converter, comprising:
   a transformer having a primary winding and first and second secondary windings;
   a primary power stage, coupled to said primary winding, associated with a main controller that controls a primary power switch to regulate a voltage proportional to a weighted sum of first and second outputs of said power converter;
   a first secondary stage, coupled to said first secondary winding, including a first synchronous rectifier circuit coupled to a first output controller that regulates a voltage at said first output; and
   a second secondary stage, coupled to said second secondary winding, including a second synchronous rectifier circuit coupled to a second output controller that regulates a voltage at said second output, one of said first and second output controllers reducing a drive signal to a corresponding one of said first and second synchronous rectifier circuits when a corresponding voltage at one of said first and second outputs exceeds a voltage proportional to said weighted sum.

16. The power converter as recited in claim 15 further comprising a resistor divider network coupled to said first and second secondary stages.

17. The power converter as recited in claim 16 wherein a resistor of said resistor divider network provides a deadband for said first and second output controllers.

18. The power converter as recited in claim 15 wherein each of said first and second output controllers comprises operational amplifiers.

19. The power converter as recited in claim 15 wherein the other of said first and second output controllers maintains a drive signal to the corresponding other said first or second synchronous rectifier circuits substantially unmodified.

20. The power converter as recited in claim 15 wherein each of said first and second synchronous rectifier circuits comprise at least one synchronous rectifier switch.

21. The power converter as recited in claim 15 wherein each of said first and second synchronous rectifier circuits comprise at least one drive voltage limiting switch.

* * * * *